United States Patent
Priem et al.

(10) Patent No.: US 7,136,068 B1
(45) Date of Patent: Nov. 14, 2006

(54) TEXTURE CACHE FOR A COMPUTER GRAPHICS ACCELERATOR

(75) Inventors: Curtis Priem, Fremont, CA (US); Gopal Solanki, San Jose, CA (US); David Kirk, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 391 days.

(21) Appl. No.: 09/056,656

(22) Filed: Apr. 7, 1998

(51) Int. Cl.
*G06F 15/16* (2006.01)

(52) U.S. Cl. .................. 345/503; 345/531; 345/537; 345/552; 345/559; 345/568

(58) Field of Classification Search .......... 345/418, 345/419, 430, 501–503, 507, 513, 511, 582, 345/531, 537, 552, 557, 568
See application file for complete search history.

(56) References Cited

U.S. PATENT DOCUMENTS

| | | | |
|---|---|---|---|
| 4,370,710 A | 1/1983 | Kroft | |
| 4,586,038 A | 4/1986 | Sims et al. | 340/729 |
| 4,615,013 A | 9/1986 | Yan et al. | 364/521 |
| 4,727,365 A | 2/1988 | Bunker et al. | 340/728 |
| 4,821,212 A | 4/1989 | Heartz | 364/521 |
| 4,905,164 A | 2/1990 | Chandler et al. | 364/518 |
| 4,924,414 A | 5/1990 | Ueda | 364/522 |

(Continued)

FOREIGN PATENT DOCUMENTS

| | | |
|---|---|---|
| EP | 0 319 165 A2 | 6/1989 |
| EP | 0 447 222 A2 | 9/1991 |
| EP | 0 454 129 A2 | 10/1991 |
| JP | 63-80375 | 4/1988 |
| JP | 1-114990 | 5/1989 |
| JP | 5-298456 | 11/1993 |
| JP | 5-307610 | 11/1993 |
| JP | 6-36039 | 2/1994 |
| WO | WO 90/00774 | 1/1990 |

OTHER PUBLICATIONS

Igehy, H., Eldridge, M., Proudfoot, K., "Prefetching in a Texture Cache Architecture", Proceedings of the 1998 EUROGRAPHICS/SIGGRAPH Workshop on Graphics Hardware, 1998, pp. 133–142.*

Alan Norton et al.; "Clamping: A Method of Antialiasing Textured Surfaces by Bandwidth Limiting in Object Space," *Computer Graphics*, vol. 16, No. 3 (Jul., 1982), pp. 1–8.

Nobuyuki Yagi et al.; "A Programmable Video Signal Multi–Processor for HDTV Signals," *IEEE*, (1993), pp. 1754–1757.

Graham J. Dunnett et al.; "The Image Chip for High Performance 3D Rendering," *IEEE*, (Nov., 1992) pp. 41–52.

James E. Dudgeon, et al; "Algorithms for Graphics Texture Mapping," *IEEE*, (1991), pp. 613–617.

Akira Yamazaki et al.; "A Concurrent Operating CDRAM for Low Cost Multi–Media," *1993 Symposium on VLSI Circuits—Digest of Technical Papers*, (May 19–21, 1993), Kyoto, Japan, pp. 61–62.

Dave Bursky; "Combination DRAM–SRAM Removes Secondary Caches," *Electronic Design*, (Jan. 23, 1992), pp. 39–40, 42–43.

(Continued)

*Primary Examiner*—Ulka J. Chauhan (57) ABSTRACT

A method and apparatus which includes a graphics accelerator, circuitry responsive to pixel texture coordinates to select texels and generate therefrom a texture value for any pixel the color of which is to be modified by a texture, and a cache for texels for use by the circuitry to generate texture value for any pixel.

7 Claims, 5 Drawing Sheets

U.S. PATENT DOCUMENTS

| | | | |
|---|---|---|---|
| 4,935,879 A | 6/1990 | Ueda | 364/522 |
| 4,945,495 A | 7/1990 | Ueda | 364/518 |
| 4,945,500 A | 7/1990 | Deering | 364/522 |
| 5,029,225 A | 7/1991 | Ueda | 382/28 |
| 5,097,427 A | 3/1992 | Lathrop et al. | 395/130 |
| 5,157,388 A | 10/1992 | Kohn | 340/800 |
| 5,179,638 A | 1/1993 | Dawson et al. | 395/125 |
| 5,185,856 A | 2/1993 | Alcorn et al. | 395/130 |
| 5,222,205 A | 6/1993 | Larson et al. | 395/130 |
| 5,224,208 A | 6/1993 | Miller, Jr. et al. | 395/125 |
| 5,255,360 A | 10/1993 | Peaslee et al. | 395/162 |
| 5,301,287 A * | 4/1994 | Herrell et al. | 711/202 |
| 5,392,393 A | 2/1995 | Deering | 395/162 |
| 5,493,643 A | 2/1996 | Soderberg et al. | 395/162 |
| 5,517,611 A | 5/1996 | Deering | 395/163 |
| 5,519,823 A | 5/1996 | Barkans | 395/143 |
| 5,526,511 A | 6/1996 | Swenson et al. | |
| 5,548,709 A | 8/1996 | Hannah et al. | 395/164 |
| 5,598,517 A | 1/1997 | Watkins | |
| 5,696,892 A * | 12/1997 | Redmann et al. | 345/473 |
| 5,706,481 A | 1/1998 | Hannah et al. | 395/519 |
| 5,758,182 A * | 5/1998 | Rosenthal et al. | 710/3 |
| 5,760,783 A | 6/1998 | Migdal et al. | 345/430 |
| 5,761,720 A * | 6/1998 | Krishnamurthy et al. | 711/140 |
| 5,790,130 A * | 8/1998 | Gannett | 345/430 |
| 5,831,640 A * | 11/1998 | Wang et al. | 345/521 |
| 5,842,015 A | 11/1998 | Cunniff et al. | |
| 5,844,576 A * | 12/1998 | Wilde et al. | 345/525 |
| 5,852,443 A | 12/1998 | Kenworthy | |
| 5,864,512 A * | 1/1999 | Buckelew et al. | 365/230.01 |
| 5,864,876 A * | 1/1999 | Rossum et al. | 711/206 |
| 5,867,166 A | 2/1999 | Myhrvold et al. | |
| 5,886,701 A * | 3/1999 | Chauvin et al. | 345/418 |
| 5,926,187 A * | 7/1999 | Kim | 345/435 |
| 5,945,997 A * | 8/1999 | Zhao et al. | 345/430 |
| 5,949,429 A * | 9/1999 | Bonneau et al. | 345/433 |
| 5,987,567 A * | 11/1999 | Rivard et al. | 711/118 |
| 5,990,902 A * | 11/1999 | Park | 345/430 |
| 5,990,913 A * | 11/1999 | Harriman et al. | 345/521 |
| 6,002,410 A * | 12/1999 | Battle | 345/513 |
| 6,003,106 A * | 12/1999 | Fields, Jr. et al. | 710/129 |
| 6,011,565 A | 1/2000 | Kuo et al. | |
| 6,067,090 A | 5/2000 | Sreenivas et al. | |
| 6,085,292 A | 7/2000 | McCormack et al. | |
| 6,097,402 A * | 8/2000 | Case et al. | 345/512 |
| 6,173,378 B1 | 1/2001 | Rozario et al. | |
| 6,204,863 B1 * | 3/2001 | Wilde | 345/515 |
| 6,215,507 B1 * | 4/2001 | Nally et al. | 345/516 |
| 6,252,608 B1 | 6/2001 | Snyder et al. | |
| 6,253,262 B1 | 6/2001 | Rozario et al. | |
| 6,259,460 B1 * | 7/2001 | Gossett et al. | 345/552 |
| 6,278,645 B1 | 8/2001 | Buckelew et al. | |
| 6,333,743 B1 | 12/2001 | Gossett et al. | |

OTHER PUBLICATIONS

John Poulton et al.; "Breaking the Frame–Buffer Bottleneck with Logic Enhanced Memories," *IEEE Computer Graphics & Applications*, (Nov., 1992), pp. 65–74.

David A. Patterson et al.; "Computer Architecture a Quantitative Approach," ©1990 Morgan Kaufmann Publishers, Inc. [ISBN 1–55860–069–8], pp. 425–432.

Stephen A. Ward et al.; "Computation Structures," (Second Printing), ©1990 MIT Press ISBN 0–262–23139–5), pp. 476–478.

Loring Wirrel; "Intel's i860 Takes High–End Graphics Lead," *Electronic Engineering Times* (Mar. 26, 1990) pp. 134, 136.

M. Agate et al.; "A Multiple Application Graphics Integrated Circuit—MAGIC,"*Eurographics '86*, (©Eurographics Association 1986), pp. 67–77.

Michael Deering et al.; "The Triangle Processor and Normal Vector Shader: A VLSI System for High Performance Graphics," *Computer Graphics*, vol. 22, No. 4, (Aug., 1988), pp. 21–30.

Paul Winser et al.; "Architectures for Mass Market 3D Displays," *Eurographics '88*, (©Eurographics Association), pp. 273–283.

David Kirk et al.; "The Rendering Architecture of the DN10000VS," *Computer Graphics*, vol. 24, No. 4 (Aug. 1990), pp. 299–307.

Forrest Norrod et al.; "An Advanced VSLI Chip Set for Very–High–Speed Graphics Rendering," *Conference Proceedings—NCGA '91 Conference & Exposition*, (Apr. 22–25, 1991, Chicago), pp. 1–10.

A.M. Kovalev et al.; "Computer Systems for Image Analysis and Synthesis—Increasing the Quality of Texture Mapping onto Planar Surfaces," *Optoelectronics, Instrumentation and Data Processing*, No. 3, 1991, pp. 3–10.

Adrian Sfarti et al.; "Method for Filling Shaded, Textured z–Buffered Polygons," 13 pages. (undated).

Intel Computers, "i860™ 64–Bit Microprocessor Simulator and Debugger Reference Manual," Version 3, Jan. 1990, 167 pages.

Larry J. Thayer; "Advanced Workstation–Graphics Hardware Features," *Conference Proceedings—NCGA 1990*, (pp. 309–315).

Williams, T., "80860 May Force Rethinking of Graphics Systems Architectures," Computer Design, May 1, 1989

1860 64–Bit Microprocessor, Preliminary Data Sheet, Oct. 1989.

1860 Microprocessor Family, Programmer's Reference Manual 1991, Intel Corporation.

1860 Microprocessor Hardware Reference Manual 1990, Intel Corporation.

* cited by examiner

TEXTURE CACHE FOR A COMPUTER GRAPHICS ACCELERATOR

BACKGROUND OF THE INVENTION

1. Field of the Invention

This invention relates to computer systems, and more particularly, to methods and apparatus for caching data representing the texture of surfaces to be displayed by a computer.

2. History of the Prior Art

In three dimensional graphics, surfaces are typically rendered by assembling a plurality of polygons into a desired shape. The polygons are conventionally triangles having vertices which are defined in world space by three dimensional distance coordinates, by color values, and by texture coordinates. The color values define the brightness of each of red/green/blue (r, g, b) colors at each vertex and thus the color at each vertex. The texture coordinates (u, v) define the coordinates of each vertex on a texture map defined by values stored in memory. Other characteristics such as transparency, fog, spectral colors, and additional textures may also define each vertex in a particular system to provide more sophisticated rendering.

It has been the practice that an application program executing on a central processor provides to a graphics accelerator the coordinates and attributes of the vertices of each triangle which is to be included in the shape being assembled for display. The surfaces represented by an assembly of polygons are, as a generality, being viewed in perspective. Typically, the application furnishes the horizontal (x) and vertical (y) distance coordinates as screen values. If instead the application furnishes the distance coordinates as world space values, then these values should, for proper display, be transformed into screen coordinates by a perspective transformation process. Along with the distance coordinates, the application typically furnishes the color values, the texture coordinates, and other attributes of the vertices as world space values. If the x and y screen coordinates of the vertices are known, the pixels defining a triangle on the screen may be determined. Then, the world space depth values (z), the color values, and the texture coordinates may be used to determine the depth value, the color values, and the texture coordinates for each pixel.

In order to provide perspective-correct values for each of the various attributes of a pixel to be displayed, the world space values of these attributes should be transformed into screen values. The vertices of a triangle define a plane in world space so the depth of positions in the triangle vary linearly from one vertex to the other within the triangle in world space. This allows the depth value for each position in the triangle in world space to be determined by a linear interpolation process. If the depth at any position in the triangle can be known, then the depth of each pixel which defines the triangle on the screen may be determined by perspective transformation of the world space depth values.

Similarly, the color values and the texture coordinates for each pixel defining the triangle vary linearly from vertex to vertex in world space; and the same type of linear interpolation process and perspective transformation could be used to find the color values and texture coordinates for each pixel in screen space.

Once the depth value, color values, and texture coordinates for each pixel have been determined, the texture coordinates could be utilized to determine texture values from the related texture map; and these texture values could then be utilized to modify the color values of each pixel in the triangle.

Although, all of this is conceivable, the prior art has not provided hardware to accomplish these processes because of the very large number of steps required and the time necessary to accomplish those steps. Instead, most of the attributes provided by an application program are simply treated as though they are screen coordinates. This provides colors and other attributes which may be somewhat distorted but useable. However, texture patterns are so distorted by such a compromise that they are unusable.

A texture map is a matrix of values which describe a pattern to be applied to the surface of the triangle to vary the colors in accordance with the pattern. Sets of texture coordinates u and v each indicate a particular texture value (texel) in a texture map and allow that texel to be =accessed. The texture coordinates of the vertices of a triangular surface area thus define the position of the triangle on the texture map so that the texels within the triangle determine the texture applied to each portion of the surface of the triangle. Each individual screen pixel describing the triangle covers some portion of the texture map as the triangle is projected onto the screen.

Screen texture coordinates obtained by the linear interpolation and perspective projection processes are not typically integral values. On the other hand, indexing into a texture map is accomplished using integral coordinates. Consequently, non-integral coordinates obtained by interpolation and perspective projection must somehow be used to obtain texture values. A simple method of obtaining texture values uses the closest integral u and v values for each pixel to index into the texture map and then selects the texture value at that intersection. A more accurate method of determining a texture value called bilinear interpolation utilizes the integer portion of the u and v coordinates at the center of each pixel to determine four additional sets of integral coordinates defining positions on a texture map surrounding the pixel center. The process selects the texels at these four positions and then uses the fractional portion of the texture coordinates at the pixel center to weight the texture values surrounding the index point. The four weighted texture values are combined into a more accurate representation for modifying the color values of that pixel to reproduce the texture pattern.

Those skilled in the art have recognized that where a pixel covers a very large number of texture values on a texture map, only a small portion of those values will be represented in the final texture value selected to modify the color of that pixel using the methods described.

Consequently, a more accurate method of texture mapping has been devised which provides texture maps at a plurality of different scales. A proper scale can be chosen so that the pixels defining the individual triangles may be made to cover numbers of texels in the projection of the texture map in screen space which accurately reproduce the texture value. The process of selecting a texture value for a pixel then includes an initial step for each particular triangle being rendered in which a texture map is selected having a scale adapted to accurately represent texture values for the pixels of that triangle. This selection may include an additional process of selecting scales above and below a desired scale and interpolating between those scales to reach a final scale.

Although these methods provide progressively more accurate texture values for pixels if the triangle lies in a plane parallel to the screen surface, they are all based on the assumption that the projection of a pixel onto the texture map is square or rectangular in shape. This assumption is incorrect in the greater number of cases when three dimensional shapes are being rendered. In fact, none of these methods is capable of describing with sufficient accuracy the texture values which should be attributed to the pixels when three dimensional shapes are rendered in any significant perspective on a flat screen surface.

Because of this, additional processes are being developed which include methods for determining texture values at a greater plurality of points within a pixel all of which points are positioned with regard to both the shape of the pixel and the shape of the texture map. In such methods, texture values are determined at each of these plurality of points (or at four points surrounding each point of this plurality of points) within a projected pixel and the values blended into a single final texture value.

As may be seen, the process of determining texture values for pixels is very complex and requires very large numbers of texels for many triangles. Whatever process is used to determine accurate texture values, it is first necessary to transfer this very large number of texture values from memory to the graphics accelerator circuitry so that these texture values may be utilized in the determination of a final texture value for each pixel in the triangle.

Conventionally, the data defining the texture values for each triangle are individually transferred by the central processing unit to the graphics accelerator via the system input/output bus. This requires that the central processing unit gain access to the system bus through the bus control circuitry, send the data for a first texture value, regain control of the bus to send data regarding a second texture value, and so on. Typically, it takes a great number of bus accesses to send the texture value data for each pixel in a single triangle. As will be appreciated, this is a relatively slow process. To date, the process has been acceptable because graphics accelerators have been too slow to handle the data provided by the central processing unit. However, at least one graphics accelerator has become fast enough to handle more data than the central processing unit is capable of transferring in this manner.

To cut down on bus transit time, many graphics accelerators now utilize very large amounts of local storage on the graphics accelerator and move as many texture maps as possible to that storage. These accelerators then utilize a processor on the graphics accelerator board to access this secondary memory and thereby reduce bus transit time. However, even though these accelerators often provide eight or sixteen megabytes of data storage some part of which may be used for caching textures, this secondary memory must still be accessed in the same manner that main memory is accessed to transfer the texture values to a texture engine where the texture values are manipulated to produce a final texture value for each pixel. Even this local memory access is significantly slower than desirable.

It is desirable to provide apparatus and a method for more rapidly providing data defining texture values for use by graphics accelerator circuitry.

SUMMARY OF THE INVENTION

This and other desired results of the present invention are realized by a method and apparatus which includes a graphics accelerator, circuitry responsive to pixel texture coordinates to select texels and generate therefrom a texture value for any pixel the color of which is to be modified by a texture, and a cache to hold texels for use by the circuitry to generate texture value for any pixel.

A particular embodiment of the present invention also includes means for determining the size of each polygon relative to a texture map to be used for the particular polygon and utilizing the result to determine whether to prefill the cache with texture value data or to defer the transfer of texture values to the cache until required for processing.

These and other objects and features of the invention will be better understood by reference to the detailed description which follows taken together with the drawings in which like elements are referred to by like designations throughout the several views.

DETAILED DESCRIPTION

Figure 1:
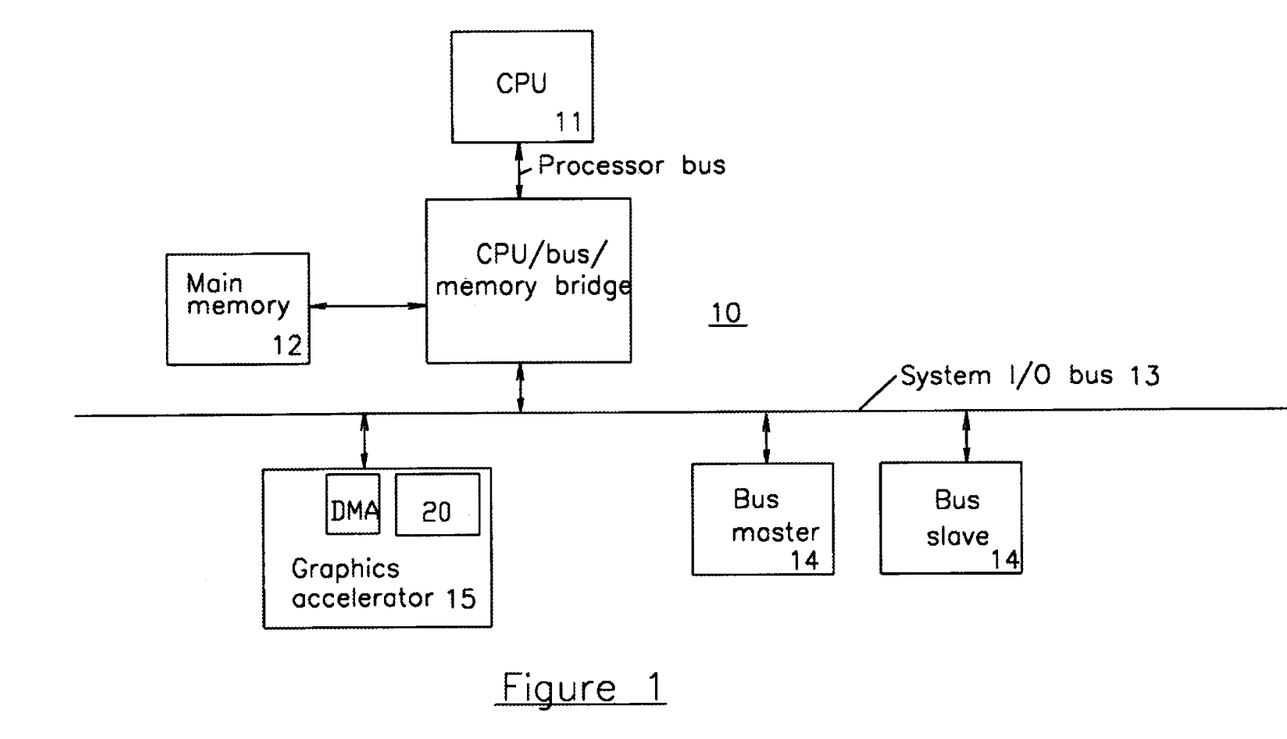
FIG. 1 is a block diagram describing a computer utilizing the present invention.

FIG. 1 is a block diagram illustrating a computer system 10 which utilizes the present invention. The system 10 includes a central processing unit (CPU) 11, main memory 12, a system input/output (I/O) bus 13, and various I/O devices 14 and 15. The I/O device 15 is a graphics accelerator circuit designed in accordance with the present invention to speed the transfer of graphics data from memory to the device 15.

Figure 3:
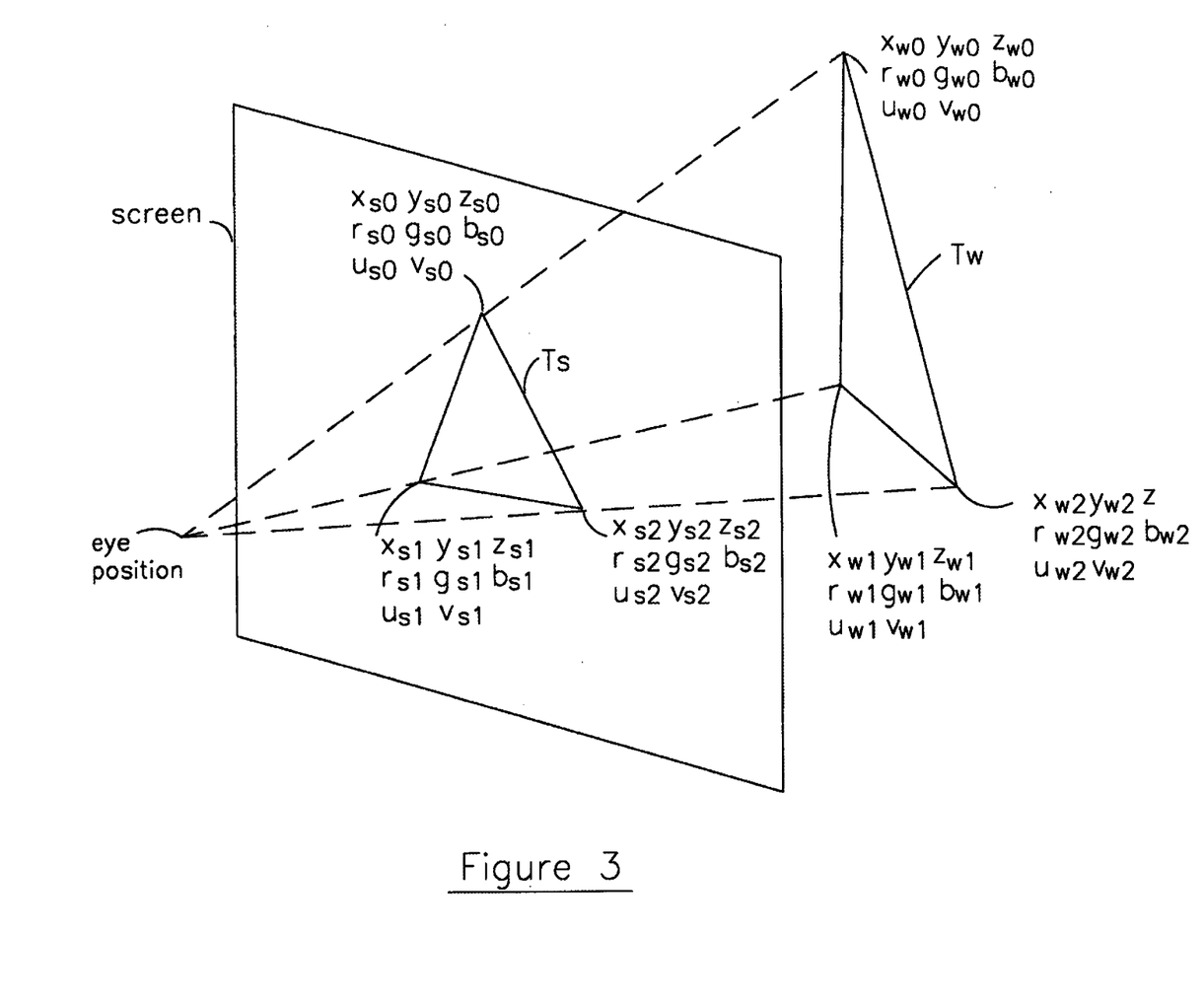
FIG. 3 is a diagram illustrating a single polygon positioned in world space and the transformation of that polygon to screen space.

FIG. 3 illustrates a triangle Tw in world space and the projection Ts of that triangle onto a display screen. The triangle Tw lies in a plane in world space which is not parallel to the plane of the display screen. The plane in world space is defined by the world space coordinates shown at the vertices of the triangle Tw while the projection Ts of the triangle onto the screen is defined by the screen coordinates shown at the vertices of the projection Ts. Conventionally, an application program executing on the central processing unit 11 transfers data to the graphics accelerator circuit 15 defining the x and y dimensions of the three vertices of the individual triangle in screen space and the other attributes (e.g., r, g, b, u, v) in world space.

Figure 2:
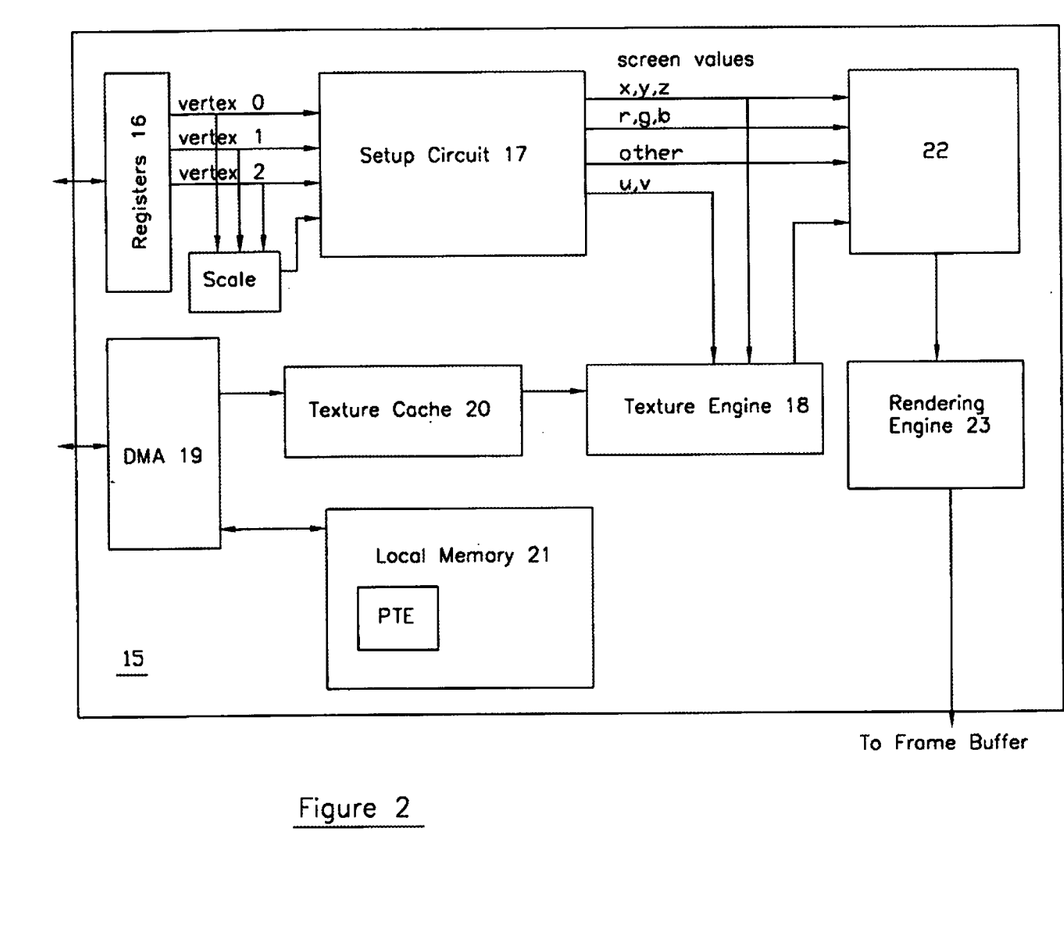
FIG. 2 is a block diagram of a graphics accelerator which is a part of the computer of FIG. 1.

FIG. 2 is a block diagram illustrating in more detail certain elements of the graphics accelerator circuit 15. The graphics accelerator 15 includes a set of registers 16 which receive input values being transferred to the accelerator. As discussed above, from the data describing the vertices of the triangle, the coordinates, color values, depth, and texture coordinates (among other attributes) are derived by the graphics accelerator. This is accomplished by a setup circuit 17 which utilizes the vertex data to derive a number of values which remain constant throughout the triangle being described and uses these constant values to generate screen values of the attributes for each pixel describing the triangle. During the setup process, the setup circuit 17 receives data from the registers 16 describing the three vertices of each triangle which is to be displayed, manipulates that data, and produces outputs for each pixel which are the perspective correct screen values of the distance coordinates, of the color values, of the texture coordinates, and of any other attributes used to describe the pixels being displayed. The values of most of these attributes are then utilized to vary the color of each pixel describing the polygon.

Figure 4:
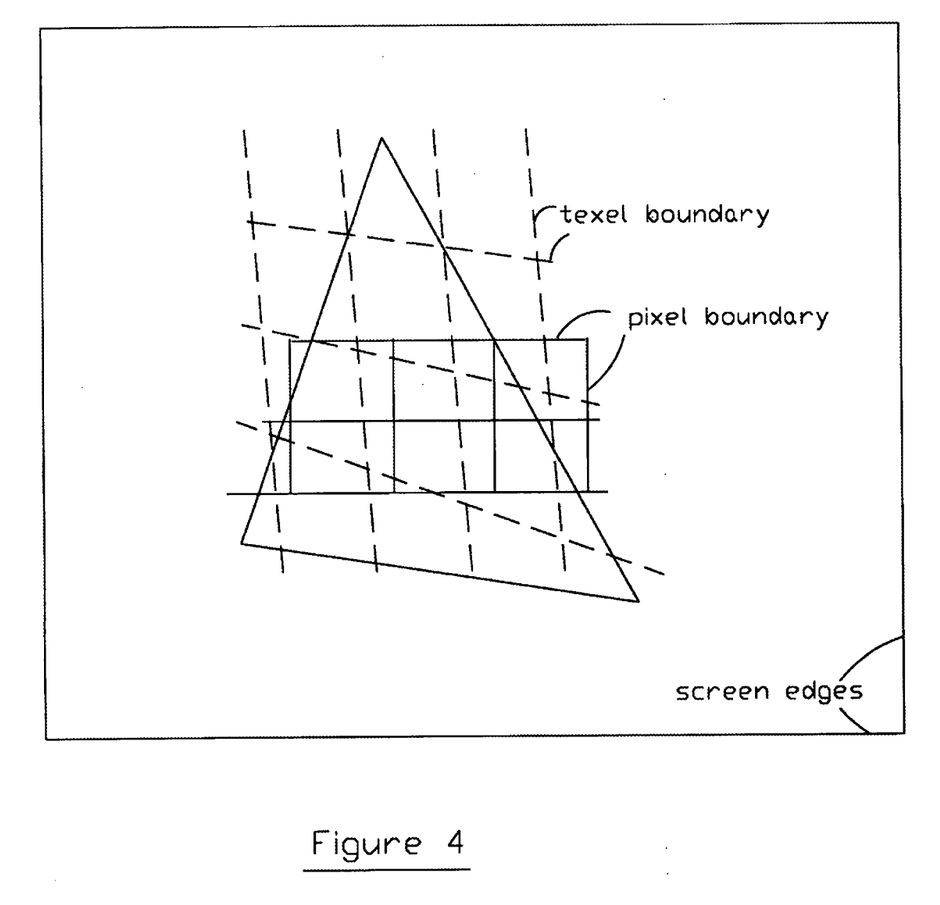
FIG. 4 is an illustration which relates pixels describing the polygon of FIG. 3 on a display screen to the texels of a texture map applied to the polygon in world space.

However, the texture coordinates generated by the setup circuit 17 only define pixel positions on a texture map. FIG. 4 illustrates the positions in which particular texels of a texture map (shown by dotted lines) are projected onto the screen. The manner in which the texels are positioned with respect to the pixels which actually describe the triangle on the screen occurs because the texels define positions on the texture map which are arranged linearly in world space while the pixels (shown as solid lines) lie in positions which are linear in screen space. The texture coordinates determined by the setup circuit 17 define a position at the center of a pixel on the screen. These coordinates are utilized to derive texture values from the texels for each pixel in the triangles in order to map the texture to the triangle.

The accelerator circuit 15 includes a texture engine 18 which utilizes the texture coordinates provided by the setup circuit 17 for each pixel to produce texture values for that pixel. The texture engine 18 also receives texels from a texture cache 20 designed in accordance with the present invention for holding texels transferred from memory. Texels in memory are accessed and provided to the texture cache 20 utilizing a direct memory access engine 19 designed in accordance with one embodiment of the present invention.

Typically, texture mapping is accomplished by a process called bilinear interpolation. By selecting the integral portion of each texture coordinate and adding one to each integral portion, four distinct sets of integral texture coordinates are generated which bracket the position of the original texture coordinates at the center of a pixel. These bracketing texture coordinates are used to derive texture values from an appropriately scaled texture map. It will be seen that the bilinear interpolation process typically selects the four closest texels to the pixel center position defined by the original texture coordinates. The values of these texels are weighted using the non-integral portions of the original texture coordinates and blended to produce a final texture value for a pixel. This final texture value is then one of the attributes used to modify the color values of the pixel before the pixel data is placed in the frame buffer for use in displaying an image. More advanced processes evaluate a plurality of positions defined by a plurality of texture coordinates within a pixel to generate a texture value for the pixel.

In order to accomplish this complex process, a very large number of texture values must be available to the graphics accelerator. In accordance with the present invention, a graphic driver responding to an application program may set up data structures (preferably in local memory 21) which describe a large portion of memory (system or local) in which particular texture maps may be stored. The kernel driver obtains page tables from the operating system and uses these to provide page table entries (PTE) 24 in each data structure giving the physical addresses of texture map data in memory (system or local). The kernel driver then provides a reference to allow the direct memory access (DMA) engine 19 top access the data structures and find the portion of memory in which the texture maps are stored in response to application commands. The kernel driver may store the page table entries 24 in local memory 21 so that the DMA engine 19 may accomplish virtual-to-physical address translations locally.

The DMA engine 19 receives commands from an application program indicating the address of a sequence of texels in memory and uses the data structure information to retrieve the addressed texels to fill the cache 20. In one embodiment of the invention, the texels are stored in cache lines which may be accessed in the cache 20 by the u and v coordinates in a pattern which provides locality in both u and v.

Although not a preferred embodiment, it would also be possible for texture data to be furnished to the cache 20 by the CPU 11 under control of the application program.

The texture values generated by the particular process utilized by the texture engine 18 are utilized along with the other attribute values to determine the color values to be placed in a pixel lighting pipeline 22 with the dimensional coordinates. The lighting pipeline 22 transfers the pixel values to a rendering engine 23 which uses the dimensional coordinates and the values stored in a frame buffer 24 to render the pixel data to the frame buffer for display.

In order to describe the cache, an embodiment in which four texels are used in a bilinear interpolation process to derive a texture value for a particular pixel will be described. However, the invention may be used with processes utilizing many more than four texels to define a final texture value for a pixel. In the embodiment described, four texture values (texels) must be available at the graphics accelerator 15 during the setup process in order to determine a texture value for any pixel. Generally, texture values are stored in memory as a part of an array which is an individual texture map. Consequently, it has been typically necessary to transfer at least four texels over the system bus from memory to the graphics accelerator for each pixel processed during the setup routine. With bus access times and other requirements, storage of texture map portions in different pages of memory, and similar problems, the time required for texel transfers is a significant limiting factor in the speed of graphics displays. Alternatively, texture maps are transferred to local memory and accessed there by the graphics accelerator. Although this eliminates the bus time required for access, it requires a significant amount of local memory and still requires accessing the texels in local memory, a time consuming process.

The present invention overcomes this problem by significantly reducing the amount of texel data required to be transferred from memory. In order to accomplish this, the present invention utilizes the cache 20 of texel data as a part of the graphics accelerating device 15. The cache 20 stores texels which are transferred to the device 15 for use. As may be seen in FIG. 4, each texel often touches a number of different pixel positions on the output display. Since the generation of pixel texture values typically requires the utilization of four adjacent texels in a texture map to produce a single texture value for each pixel rendered on the output display, many of the texels are used a plurality of times in computing adjacent pixels defining a triangle. Consequently, texel values stored in the cache 20 may be used and reused in generating texture values for the pixels in any triangle. Moreover, the texels which are stored in the cache 20 for generating texture value for one triangle are often the same texels used in generating texture values for an adjacent triangle. Consequently, once transferred to and stored in the cache 20, the texels need not be transferred to the cache again unless the cache replacement policy causes them to be overwritten. This significantly reduces data transfer time over the system bus or a local bus from local memory and speeds the graphics rendering process.

The cache 20 is directly available to the texture engine 18 and may be accessed using the u and v texture coordinates.

Figure 5:
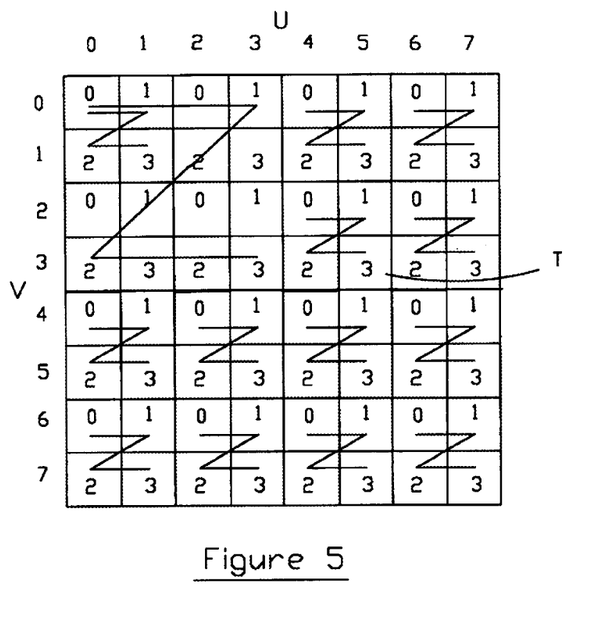
FIG. 5 is an illustration of a two dimensional arrangement of linear data in accordance with the present invention.

This is accomplished by assigning addresses in the cache 20 to provide the logical arrangement shown in FIG. 5. It would be possible to provide a cache which was large enough to hold an entire texture map by simply providing a very large cache. However, the size of such a cache would make it costly to implement and would greatly increase the time required for transmission of texture values since an entire texture map of values would have to be transferred for each triangle using a new texture map, no matter how small a part of the texture map was to be used by the triangle.

The present invention provides a cache having a size estimated to be sufficient to store, in most cases, texels defining the texture over an entire triangle. By reducing the size of the cache, the number of texels being transferred for each new triangle is much less than the number required to transfer an entire texture map. Moreover, texels transferred to the cache are reused thereby reducing the total amount of data transferred. Consequently, the time of transfer is significantly reduced. Furthermore, the cost of such a cache is much less than that required to hold entire texture maps.

One difficulty in providing a cache to hold texture values is that in contrast to the typical one dimensional processor cache utilized to store data and instructions recently utilized, a cache for texture values must be accessed in two dimensions in order to provide rapid operation. That is, a texel is accessed in a texture map by using the u and v coordinates to determine a position in the map in the same way that x and y coordinates determine a position on the screen. The integer portions of any texture coordinate pair defines a position in the plane of the texture map. It is necessary to access four texels surrounding each of whatever number of positions at which values are determined in order to compute the final texture value for a pixel. Consequently, the positional relationship of the texels to one another should be maintained in the cache in order to provide rapid access to the values.

Although the actual texture values are stored in system memory, in local memory, and in the cache 20 in a linear fashion, the cache is arranged so that it may be addressed using the u and v coordinates. In FIG. 5, the logical result of this addressing arrangement is illustrated. That is, the texels are placed in the cache in logical positions which match positions in the texture map. This allows any texel to be addressed using the u and v coordinates provided for each pixel. It should be noted that the arrangement allows cache positions to be maintained for the texels which to the greatest degree possible assures that they are accessed in the same page of memory thereby significantly reducing access time.

Figure 6:
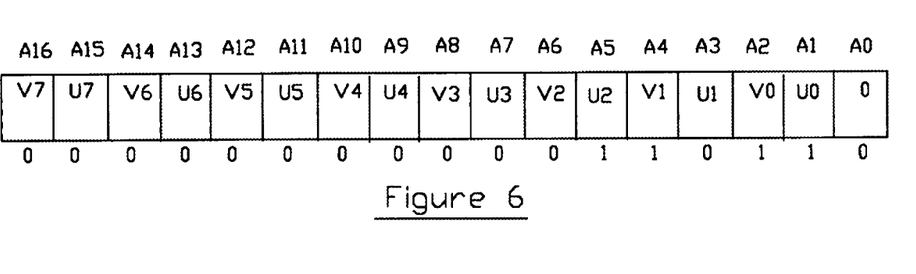
FIG. 6 is a diagram illustrating an addressing arrangement in accordance with the present invention.

This is accomplished by assigning addresses in the cache 20 to provide the logical arrangement shown in FIG. 5. FIG. 6 illustrates an addressing arrangement which may be used for addressing both linear memory in which texture maps are stored and the cache 20. When a cache line in the cache 20 is filled, the line is filled linearly. However, the data in that line defines a sequence which is a part of a texture map. The texels in a linear sequence define a logical arrangement which starts at the upper left box in FIG. 5 and proceeds through texels which are positioned in a texture map in the manner illustrated in FIG. 5. Thus, a sequence in a line of cache starts at the "0" box which holds a two byte texel and follows a "Z" pattern through the first four positions. These positions store four texels which are arranged logically in a texture map as shown in FIG. 5 and provide texels which may define a single set of texture coordinates which position a pixel with reference to the map. The sequence continues by proceeding to the next group of four boxes in a pattern shown by the larger "Z" in FIG. 5. The Z pattern continues through the second set of four boxes and into a third set of four boxes below the first set. The Z pattern continues and continues to widen.

The addressing arrangement shown in FIG. 6 provides seventeen address bits which define the position of any texel in linear memory. The exemplary bits of the address under each square allow the 27th texel (marked by "T") to be addressed in a linear memory. The address is determined by programming each texel in a texture map in linear memory to reside at an address determined by the u and v positions of the texture in the texture map. Thus, to assign an address to the texel T lying at the logical intersection of U5 and V3 in FIG. 5, the U and V address bits in the address are chosen to indicate "5" and "3." This address arrangement which interleaves U and V bits provides indexing into the linear memory to access the positions in a two dimensional texture map.

In addition to simply caching texel data, the present invention also prefetches the texel data during the setup process during which the pixels in a triangle, the depth, color values, and texture coordinates are determined for those pixels. In this manner, texels are already available for all pixels of the entire triangle before any are needed to derive texture values.

In one embodiment, a cache size is selected which is sufficient to hold the data for two of a large percentage of the typical triangles utilized for rendering a shape to a display. A particular texture cache stores sixty-four texel values in each cache line and has a total of sixty-four cache lines.

In accordance with the present invention, before texels are fetched by the DMA engine to the cache 20, a test is conducted to determine whether the texels required for the triangle are few enough to fit the space provided in the cache 20. In order to conduct this test, in one embodiment, the setup engine first determines an appropriate scale for a texture map to be used. A particular test utilizes the u and v coordinates and the x and y screen coordinates furnished for each of the three vertices to determine the maximum and minimum values of texture coordinates and pixels in the triangle. With these ranges, the number of texels which are to be utilized to compute a final texture value for each pixel can be selected to provide an accurate texture value for each individual pixel in the triangle to be displayed. That is, if four texels are to be used for determining a final texture value for each pixel using a bilinear interpolation process, then a texture map having a scale providing approximately four texels touching each pixel can be selected. This allows each of the texels surrounding the center of a pixel to be used in determining a final texture value without the necessity to ignore large numbers of texels covered by the pixel.

The scale of texture map to be used determines whether the texels defining a triangle being described will fit within the cache.

When the scale of the texture map is chosen, the u and v coordinates for each pixel are similarly scaled to the chosen map. At this point, the maximum and minimum u and v values at the vertices of the triangle are known and determine the number of texels in the triangle. To this value is added a number of texels sufficient to allow accesses of complete cache line to occur. The number of texels to be placed in the cache to provide textures for a triangle (assuming the storage of complete cache lines) determines whether the texels will fit into the cache 20. In one embodiment, cache lines are accessed in memory by the DMA engine 19 so that a rectangle of texels is actually read from the texture map selected and placed in the cache 20. If the number of texels in the rectangle selected for a triangle is small enough to fit within one-half of the cache 20, then the texels are prefetched from memory by the DMA engine 19 during the setup process and placed in the cache. If prefetched in this manner, the cache 20 holds all of the texels necessary to produce final texture values from the texture coordinates produced by the setup engine 17 so that there will be no wait for texels necessary to the final texture value computation for each pixel to be displayed.

If the number of texels required for the triangle is too great to fit within one-half of the cache 20, then the fetch of texels is delayed. Instead, as the texture coordinates for each pixel are generated by the setup engine 17, the texels required (four in one embodiment) are fetched on demand by the DMA engine 19. These texels are placed in the cache and retained in accordance with a cache replacement policy to be described.

The cache in one embodiment is fully associative. The manner in which texels are replaced within the cache is another feature of the invention. The texels in the cache are used to determine texture values for the pixels used to described a triangle. When texels are being prefetched to the cache to be used with a triangle, one type of replacement policy for the cache lines is used. During any period in which a triangle is being written to the frame buffer, the cache lines containing texels which are being used to compute texture values to describe that triangle cannot be overwritten. Consequently, these caches lines are marked to indicate that they cannot be replaced until the triangle is complete. To accomplish this, the cache control includes two sets of 64 flags, each set having a bit position for each cache line. When a triangle is not being rendered and texels for a new triangle which fit into one-half the cache are being placed into the cache, a bit in the first set of flags is set for each cache line filled which has not been used to indicate that the lines cannot be replaced. When the texels for that triangle have been placed in the cache 20, the cache lines and their flags are handed over to the rendering operation. The bits set in the first set of flags are not reset so long as texture values are being computed for the triangle.

As the texture values are being computed for the first triangle, a second triangle is evaluated to determine if its texels will fit into the remainder of the cache 20. Presuming that the number of texels needed will fit the remaining space when moved to the cache 20 in full cache lines, the texels for the second triangle are transferred to the cache. However, in order to speed the graphics operation, if a cache line of texels is already in the cache, it need not be transferred in a second time. Instead, the cache controller searches to see if the address of the cache line is in the cache and marks the bit in the second set of flags for that cache line to indicate that the cache line is to be used for a next triangle and is not to be replaced.

A counter walks through the cache lines as each new cache line of texels is ready to be transferred into the cache so that the particular line is known. If a line of texels is not already in the cache, the controller searches for the next cache line for which neither flag bit is set. Such a cache line is neither being used to compute texture values for a triangle being rendered not being saved for a next triangle. In this manner, texels placed in the cache remain in the cache as long as they are needed. Such a replacement policy is essentially "least recently loaded."

When texels are being placed in the cache 20 on a demand basis because texels sufficient to generate texture values for a triangle are larger than the room remaining in the cache (one-half of the cache), a different replacement policy is used. It will be recalled that the four positions at which texture values are read are determined from the integral values of the texture coordinates in a typical bilinear interpolation. Then, the non-integral portion of the texture coordinates are used to weight the four texture values during the bilinear interpolation process. Thus, in determining texture values across a scan line of a triangle mapped to a particular texture map, as a generality, two texels which are included within the computation of a texture value for a first pixel on a scan line are not used in the computation of the next pixel on the scan line. This same pattern applies as a scan proceeds across the scan line. However, when the next scan line commences, the computation of the first pixel again uses certain (probably two) of the texels used to compute the texture value of the first pixel on the preceding scan line.

In demand mode, two sets of 64 flags are used to indicate that a line of texels in the cache has been used in generating texture values for a scan line of pixels but was not reused in generating a next scan line of pixels.

In one embodiment, the bits of the flags for the cache line are set when a new cache line is placed in the cache. Then when a scan line of pixels uses that line of the cache, the flag of the first set is reset for the cache line. If a next scan line completes and a cache line of texels is not used, then both flags are reset for that cache line. If a next scan line completes and a cache line of texels is used, then both flags are set for that cache line. The two reset flags for the cache line indicate that the line of the cache may be replaced in order to provide room for texels to complete the triangle being produced.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system, comprising:

a bus;

a central processing unit coupled to said bus; and a graphics accelerator coupled to said bus, said graphics accelerator including a texture cache system, said texture cache system including a texture cache memory that stores texels to be used by a texel value generating circuit, a cache controller that performs a replacement policy determination for texel data to be stored in said texture cache memory, and a direct memory access engine that retrieves texel data from memory, wherein said cache controller includes a first set of flags and a second set of flags, each of the first set of flags and the second set of flaps having a bit position for each of a plurality of cache lines in the cache memory, wherein the cache controller is configured to set a bit position in the first set of flags for each cache line that will be used to render a first triangle, wherein the cache controller is further configured to set a bit position in the second set of flags for each cache line that will be used to render a second triangle, and wherein the cache controller is configured to only replace texels in cache lines for which neither the bit position associated with the first set of flags nor the bit position associated with the second set of flags has been set.

2. A computer system, comprising:

a bus;

a central processing unit coupled to said bus; and a graphics accelerator coupled to said bus, said graphics accelerator including a texture cache system, said texture cache system including a texture cache memory that stores texels to be used by a texel value generating circuit, wherein said texture cache system is capable of operating in a prefetch mode such that during the rendering of a first polygon, a set of texels including at least those texels needed for completely rendering a second polygon are prefetched and stored in said texture cache memory, and wherein said set of texels are prefetched if it is determined that said set of texels can fit into one half of said texture cache memory.

3. A method for processing texels, comprising:

caching a first plurality of texel values in a cache memory;

generating a first plurality of pixel texture values using the first plurality of cached texel values, said generating comprising reusing at least one of the first plurality of cached texel values;

defining a texture over a first triangle using the first plurality of pixel texture values;

determining whether a second plurality of texel values can fit into one half of the cache memory;

caching the second plurality of texel values in the cache memory if it is determined that the second plurality of texel values can fit into one half of the cache memory; and generating a second plurality of pixel texture values using at least one of the first plurality of cached texel values and at least one of the second plurality of cached texel values.

4. The method of claim 3, further comprising defining a texture over a second triangle using the second plurality of pixel texture values.

5. The method of claim 3, wherein caching the first plurality of texel values includes prefetching only the texel values necessary for defining the texture over the first triangle.

6. The method of claim 3, wherein generating each of the first plurality of pixel texture values includes reading four texel values of the first plurality of cached texel values.

7. A method for processing textures, comprising:

storing a plurality of texture maps in a main memory, transferring a subset of said plurality of texture maps from the main memory to a local memory of a graphics accelerator;

accessing texels from the subset of said plurality of texture maps in the local memory; and caching the texels in the graphics accelerator, wherein accessing texels includes reading page table entries in the local memory the page table entries providing physical addresses related to said plurality of texture maps.

* * * * *